United States Patent
Woo et al.

(10) Patent No.: US 7,633,544 B2
(45) Date of Patent: Dec. 15, 2009

(54) OPTICAL SYSTEM FOR PROCESSING IMAGE USING POINT SPREAD FUNCTION AND IMAGE PROCESSING METHOD THEREOF

(75) Inventors: Yeon Kyung Woo, Seoul (KR); Ho Seop Jeong, Kyungki-do (KR); Hwa Hun Chin, Seoul (KR); Jun Ho Mun, Kyungki-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 502 days.

(21) Appl. No.: 11/495,563

(22) Filed: Jul. 31, 2006

(65) Prior Publication Data

US 2007/0031057 A1    Feb. 8, 2007

(30) Foreign Application Priority Data

Aug. 2, 2005    (KR) ............... 10-2005-0070727

(51) Int. Cl.
  *H04N 5/232* (2006.01)
(52) U.S. Cl. ................ 348/345; 359/642
(58) Field of Classification Search ......... 348/335–369; 382/255, 272; 359/642, 645, 651, 661, 382, 359/735, 749; 250/216, 227.1, 578.1, 201.1
  See application file for complete search history.

(56) References Cited

U.S. PATENT DOCUMENTS

| 5,185,812 | A | * | 2/1993 | Yamashita et al. | 382/145 |
| 5,748,371 | A | | 5/1998 | Cathey, Jr. et al. | |
| 5,825,482 | A | * | 10/1998 | Nikoonahad et al. | 356/237.2 |
| 6,069,738 | A | * | 5/2000 | Cathey et al. | 359/558 |
| 6,927,922 | B2 | * | 8/2005 | George et al. | 359/708 |
| 6,940,649 | B2 | * | 9/2005 | Dowski, Jr. | 359/558 |
| 7,088,526 | B2 | * | 8/2006 | Braun | 359/732 |
| 7,336,430 | B2 | * | 2/2008 | George et al. | 359/708 |
| 2002/0195548 | A1 | * | 12/2002 | Dowski et al. | 250/216 |
| 2003/0103189 | A1 | * | 6/2003 | Neureuther et al. | 351/176 |
| 2003/0173502 | A1 | * | 9/2003 | Dowski et al. | 250/216 |
| 2004/0004766 | A1 | * | 1/2004 | Dowski, Jr. | 359/558 |
| 2005/0030646 | A1 | * | 2/2005 | Braun | 359/796 |
| 2005/0046944 | A1 | * | 3/2005 | Shenderova et al. | 359/565 |
| 2005/0275953 | A1 | * | 12/2005 | George et al. | 359/708 |
| 2007/0001105 | A1 | * | 1/2007 | Dowski et al. | 250/216 |
| 2007/0030368 | A1 | * | 2/2007 | Mihara et al. | 348/272 |
| 2007/0035646 | A1 | * | 2/2007 | Mihara et al. | 348/272 |
| 2008/0089598 | A1 | * | 4/2008 | George et al. | 382/255 |

* cited by examiner

*Primary Examiner*—Tuan Ho
*Assistant Examiner*—Don Nguyen

(57) ABSTRACT

Provided are an optical system for processing an image using a PSF and an image processing method thereof. The optical system includes one or more lenses, an image sensor, and an image processor. The image sensor senses an image formed by the lenses, and the image processor recovers the image sensed by the image sensor using a PSF. A BFL defined as a distance between a refractive surface of one of the lenses that is closest to an image-side and the image sensor, is controlled such that ΔPSF defined by Equation below has a value less than 100%.

$$\Delta PSF(\%) = \frac{PSF_\infty - PSF_{macro}}{(PSF_\infty + PSF_{macro})/2} \times 100$$

An image is recovered using a PSF, so that an excellent image can be obtained over a wide object distance range.

19 Claims, 14 Drawing Sheets

OPTICAL SYSTEM FOR PROCESSING IMAGE USING POINT SPREAD FUNCTION AND IMAGE PROCESSING METHOD THEREOF

RELATED APPLICATION

The present application is based on, and claims priority from, Korean Application Number 2005-70727 filed Aug. 2, 2005, the disclosure of which is hereby incorporated by reference herein in its entirety.

BACKGROUND OF THE INVENTION

1. Field of the Invention

The present invention relates to a photographic optical system having a fixed focal length, and more particularly, to a photographic optical system for providing improved image quality at a variety of object distances through image processing.

2. Description of the Related Art

Generally, an optical system of a fixed focal length cannot properly perform a focusing function because a point spread function is seriously deteriorated as a camera approaches an object. Particularly, when a close-up shot is performed on an object distant away at about 10 cm, an image is very seriously deteriorated.

To solve this problem, an optical system for performing an auto-focusing function has been proposed. However, such an optical system requires transfer of a lens or an image sensor in order to perform the auto-focusing function, and thus a driving device for the lens or the image sensor is required. Therefore, an optical apparatus to which an optical system having an auto-focusing function is applied has an increased weight and a large volume.

Therefore, an apparatus or method has been proposed to obtain an image of excellent quality over a wide range of object distances through image processing without providing a driving device for an auto-focusing function.

U.S. Pat. No. 5,748,371 discloses a method and apparatus for increasing depth of field of an optical system using a mask.

As illustrated in FIG. 1, U.S. Pat. No. '371 proposes a method and apparatus for increasing depth of field by mounting a mask 20 on a conventional optical system including a lens 25 for forming an image of an object 15, an image sensor 30 for sensing the formed image, and an image processor 35.

At this point, the mask 20 is located between the object 15 and the lens 25 such that an optical transfer function (OTF) is not influenced by misfocus over a predetermined range of object distances.

The above optical system can have similar PSFs at variety of object distances using the mask 20, but a size of the PSF becomes relatively large and asymmetric (refer to P4 in FIG. 4), so that modulation transfer function at all object distances becomes considerably low (refer to FIG. 6b).

That is, according to the conventional optical system, an image quality is seriously reduced and a recovered image quality is poor.

Therefore, an optical system and an image processing method, capable of achieving an excellent image quality over a wide range of object distances without using a driving device in a conventional optical system of a fixed focal length, is highly required.

SUMMARY OF THE INVENTION

Accordingly, the present invention is directed to an optical system for processing image using a PSF and an image processing method thereof that substantially obviate one or more problems due to limitations and disadvantages of a conventional art.

An object of the present invention is to provide an optical system and an image processing method that process an image using a PSF, capable of realizing an excellent image over a wide range of object distances including a close-up shot distance and a long distance without using a driving device.

Another object of the present invention is to provide an optical system and an image processing method that process an image using a PSF and has a small PSF and a fast image processing speed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical system for processing an image using PSF, the optical system including: one or more lenses; an image sensor for sensing an image formed by the lenses; and an image processor for recovering the image sensed by the image sensor using PSF (point spread function), wherein a BFL (back focal length) defined as a distance between a refractive surface of one of the lenses that is closest to an image-side, and the image sensor is controlled such that xPSF defined by Equation below has a value less than 100%.

$$\Delta PSF(\%) = \frac{PSF_\infty - PSF_{macro}}{(PSF_\infty + PSF_{macro})/2} \times 100 \quad \text{Equation}$$

where, $PSF_\infty$: size of PSF at infinity, $PSF_{macro}$: size of PSF at a predetermined close-up shot distance.

The image processor may select a PSF of a best image among PSFs of tentatively recovered images using a PSF table generated for each object distance, and recovers all images using the selected PSF.

The BFL is controlled such that ΔPSF has a value less than 50%.

The predetermined close-up shot distance is less than 20 cm.

The predetermined close-up shot distance is less than 10 cm.

Also, when an object is focused, a corresponding object distance may be less than 1 m.

According to an aspect of the present invention, there is provided an image processing method including: controlling a BFL defined as a distance between a refractive surface of one of lenses that is closest to an image-side and an image sensor, such that ΔPSF defined by Equation below has a value less than 100% using a size of a PSF at infinity and a size of a PSF at a predetermined close-up shot distance; and recovering an image using PSF, $$\Delta PSF(\%) = \frac{PSF_\infty - PSF_{macro}}{(PSF_\infty + PSF_{macro})/2} \times 100,\quad \text{Equation 5}$$

where $PSF_\infty$: size of PSF at infinity, $PSF_{macro}$: size of PSF at a predetermined close-up shot distance.

The recovering of the image includes; generating a PSF table for each object distance; tentatively recovering shot images using the PSF table; comparing tentatively recovered images with one another to select a PSF of a best recovered image; and recovering all images using the selected PSF.

The controlling of the BFL is performed such that ΔPSF has a value less than 50%.

In the controlling of the BFL, the predetermined close-up shot distance is less than 20 cm.

In the controlling of the BFL, the predetermined close-up shot distance is less than 10 cm.

The generating of the PSF table includes dividing the object distance into two or more steps to generate the PSF table.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
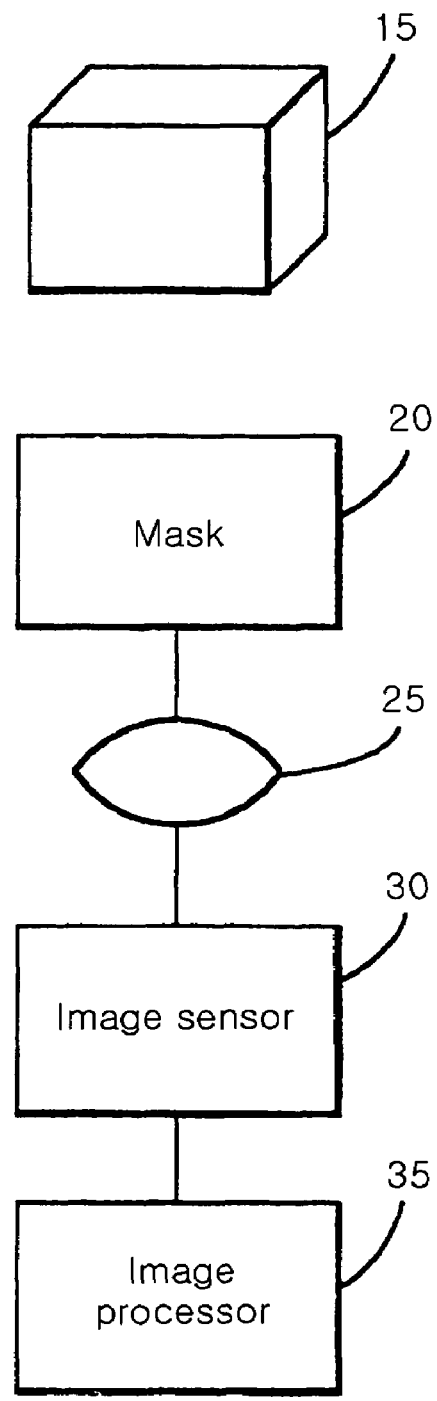
FIG. 1 is a view of an optical system to which a mask is applied according to a conventional art.
Figure 2:
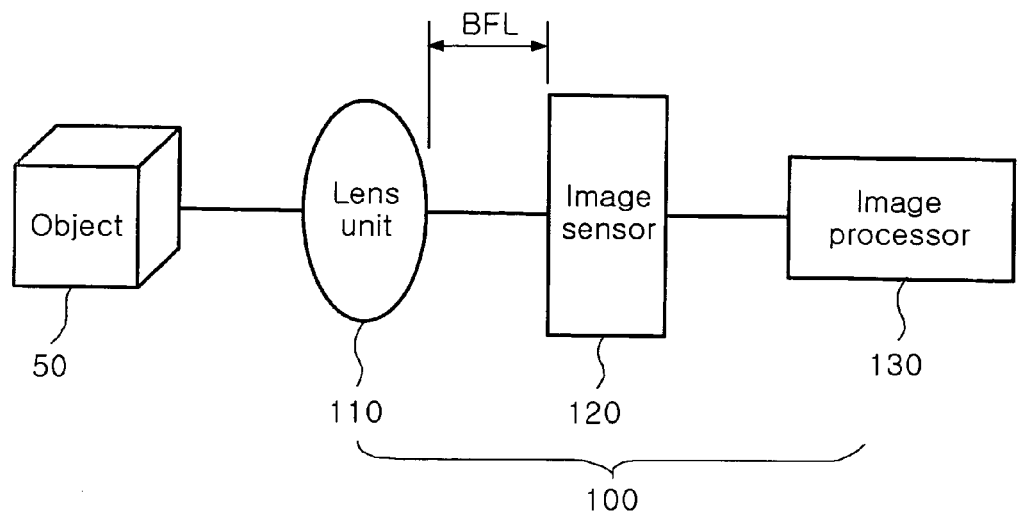
FIG. 2 is a view of an optical system for processing an image using PSF according to the present invention.
Figure 3:
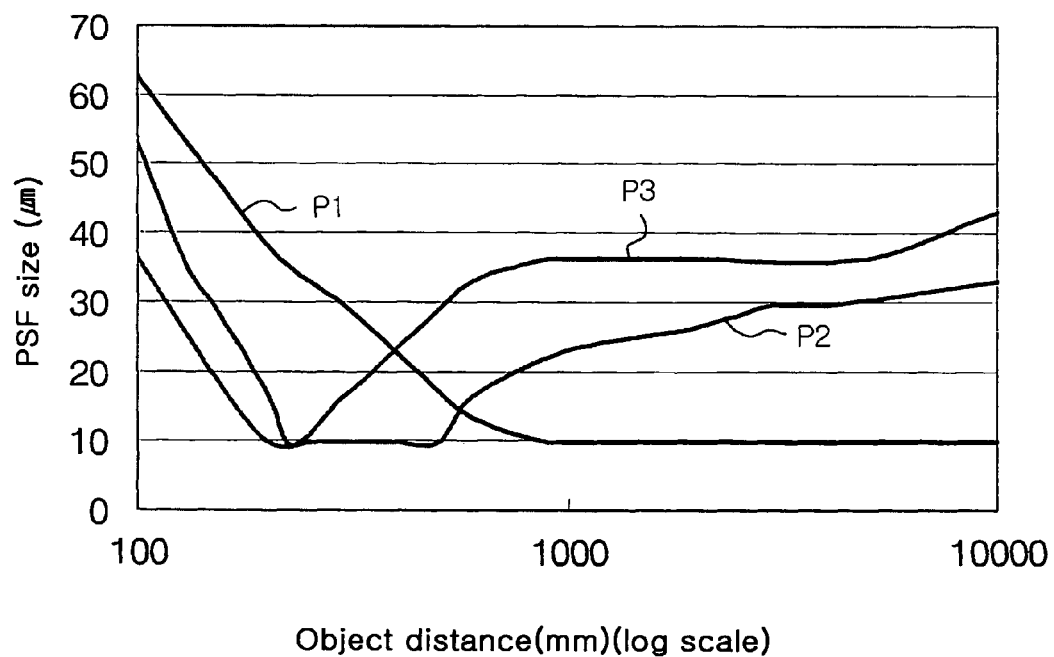
FIG. 3 is a graph illustrating a size of PSF for controlling BFL according to the present invention.
Figure 4:
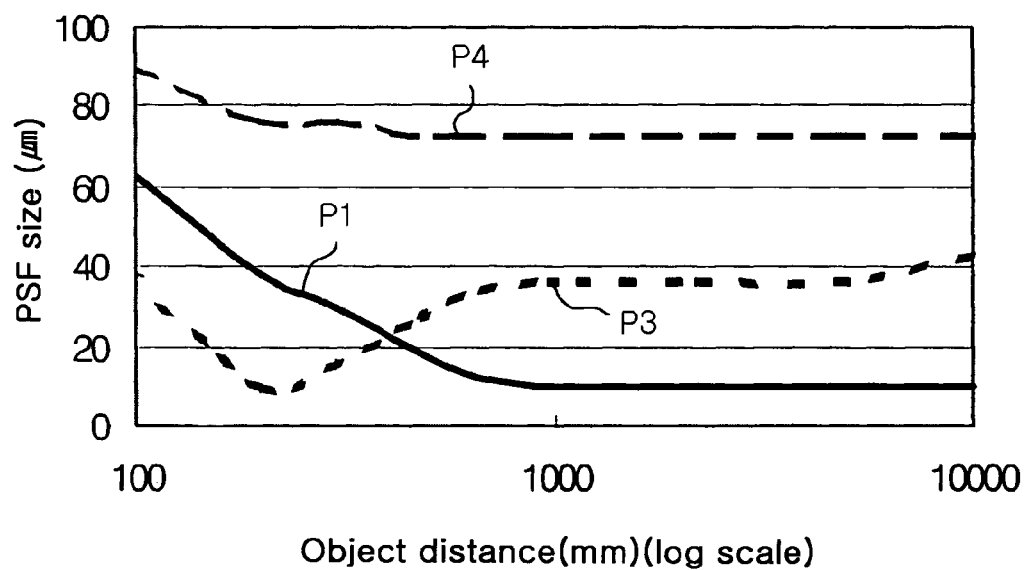
FIG. 4 is a graph comparing a size of PSF of a conventional art with that of the present invention.

FIG. 2 is a view of an optical system for processing an image using PSF according to the present invention, FIG. 3 is a graph illustrating a size of PSF for controlling BFL according to the present invention, FIG. 4 is a graph comparing a size of PSF of a conventional art with that of the present invention, FIG. 5 is a graph illustrating LSFs of a conventional art and the prevent invention, and FIG. 6 is a graph illustrating an MTF of a conventional art and the prevent invention.

Figure 7:
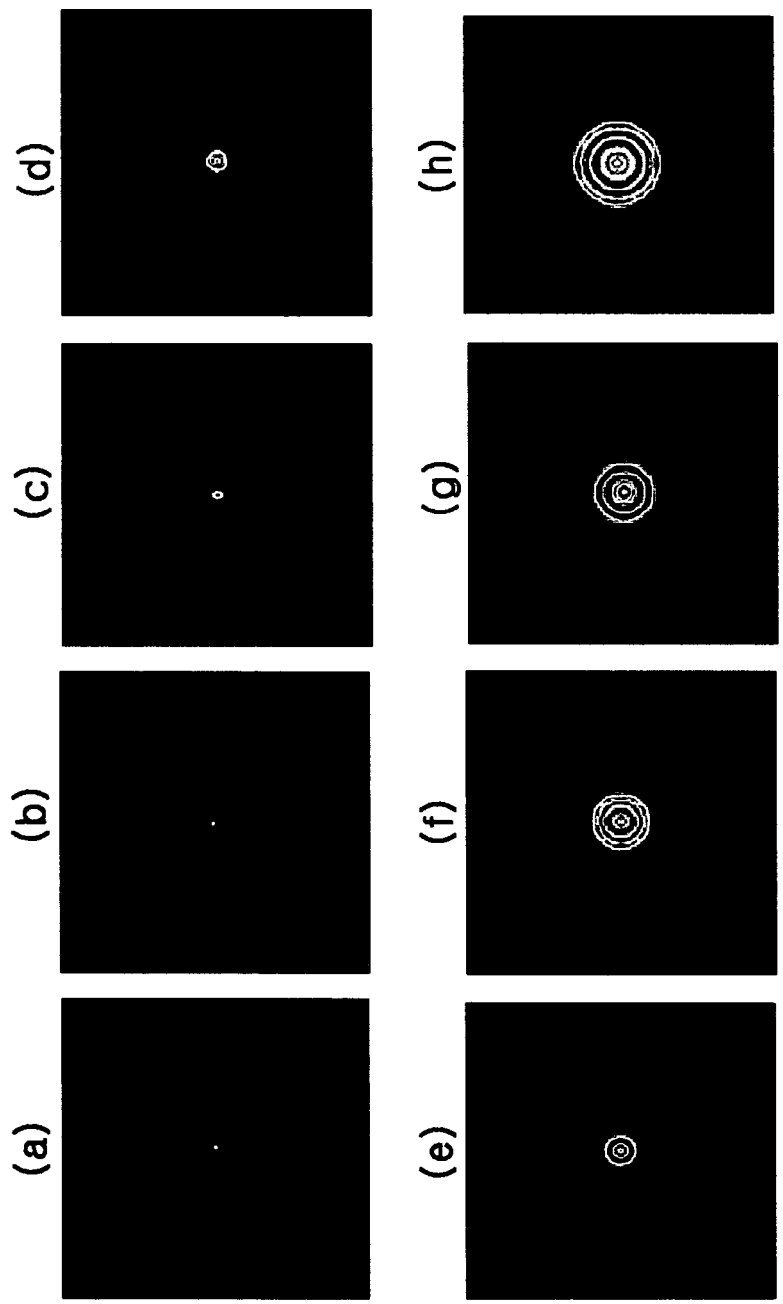
FIG. 7 is a view illustrating images of reference PSFs for respective object distances of a general optical system having a fixed focal length according to a conventional art.
Figure 8:
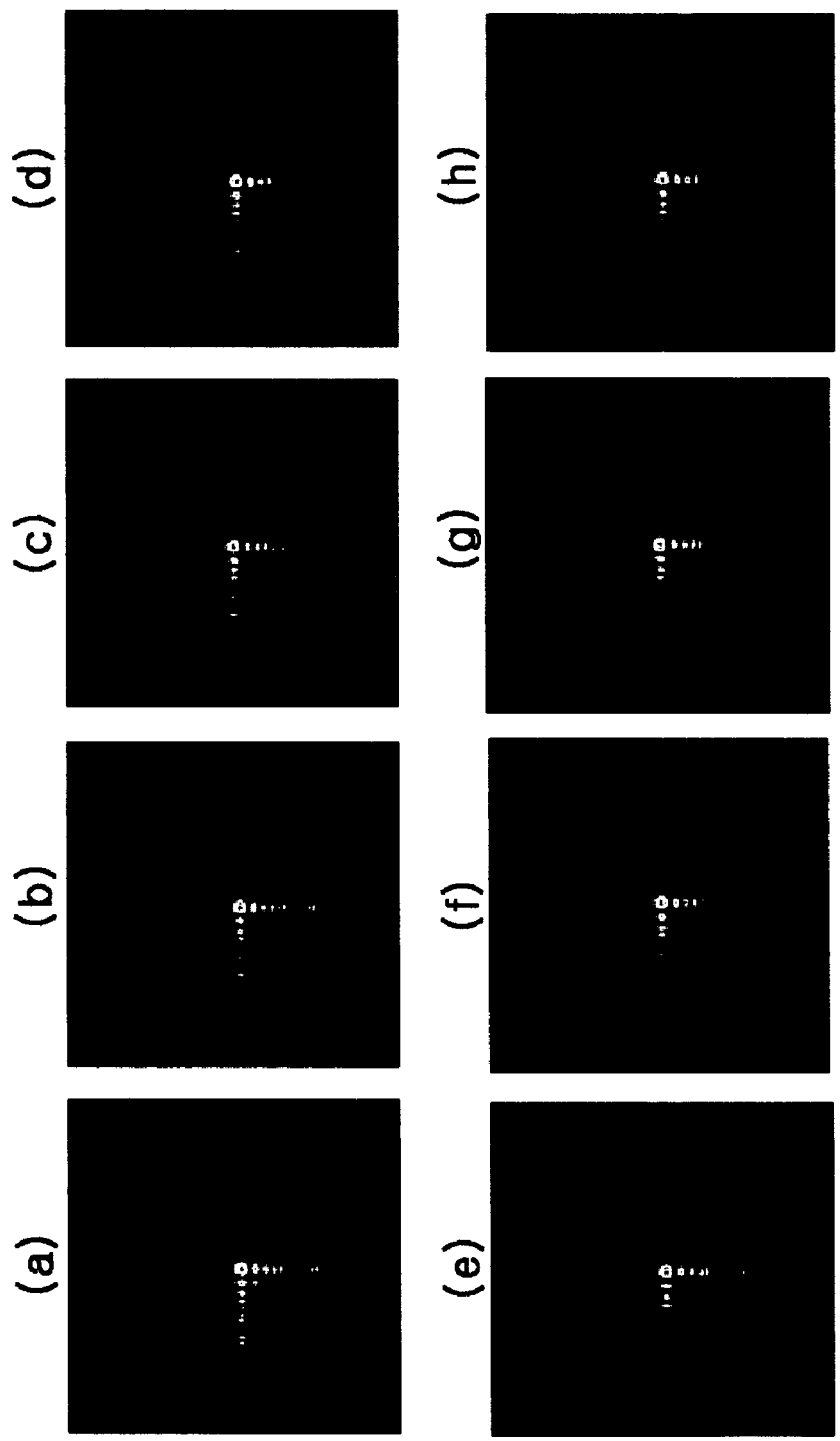
FIG. 8 is a view illustrating images of reference PSFs for respective object distances of a conventional optical system to which a mask is applied.
Figure 9:
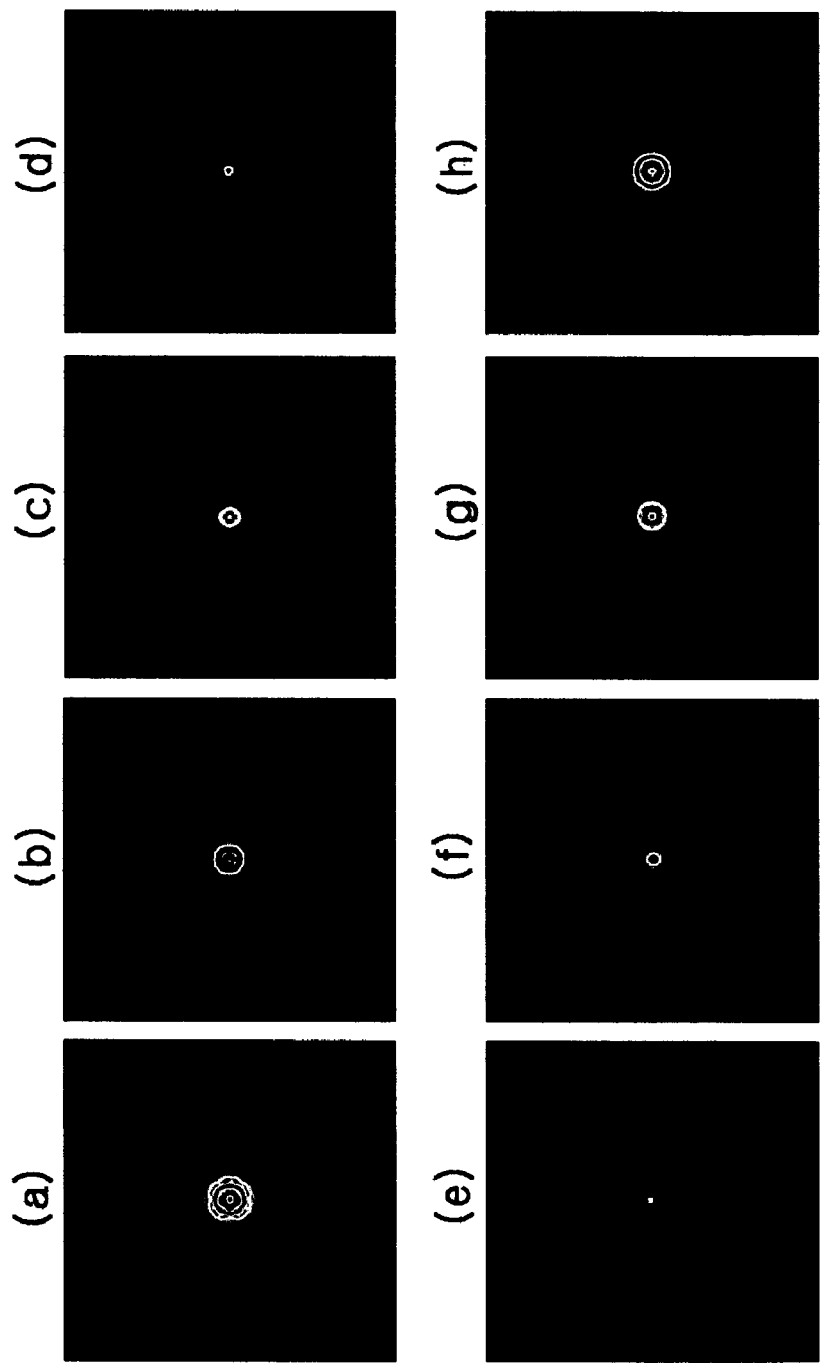
FIG. 9 is a view illustrating images of reference PSFs for respective object distances according to the present invention.
Figure 10:
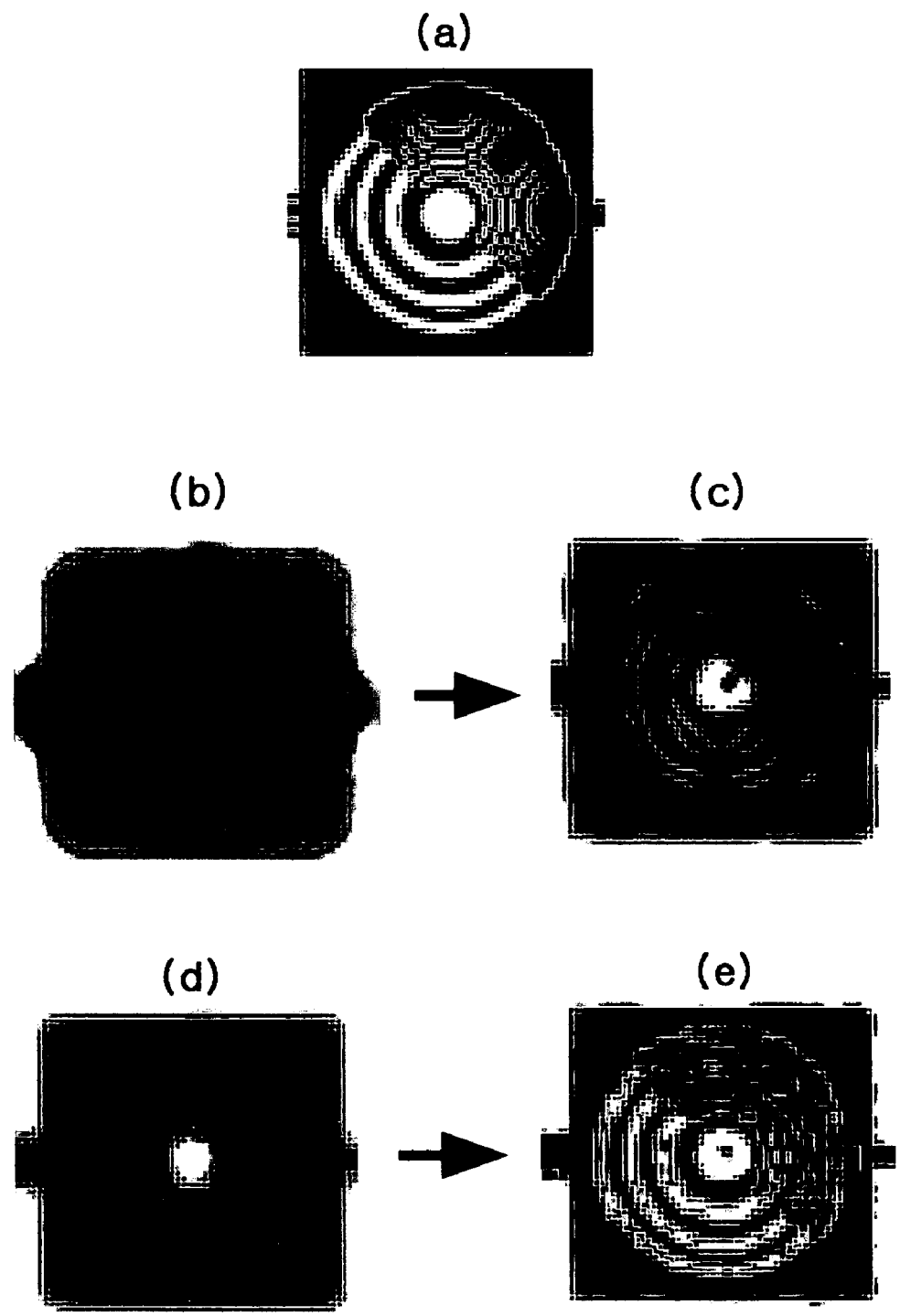
FIG. 10 is a view explaining image recovery of a conventional art and the prevent invention.
Figure 11:
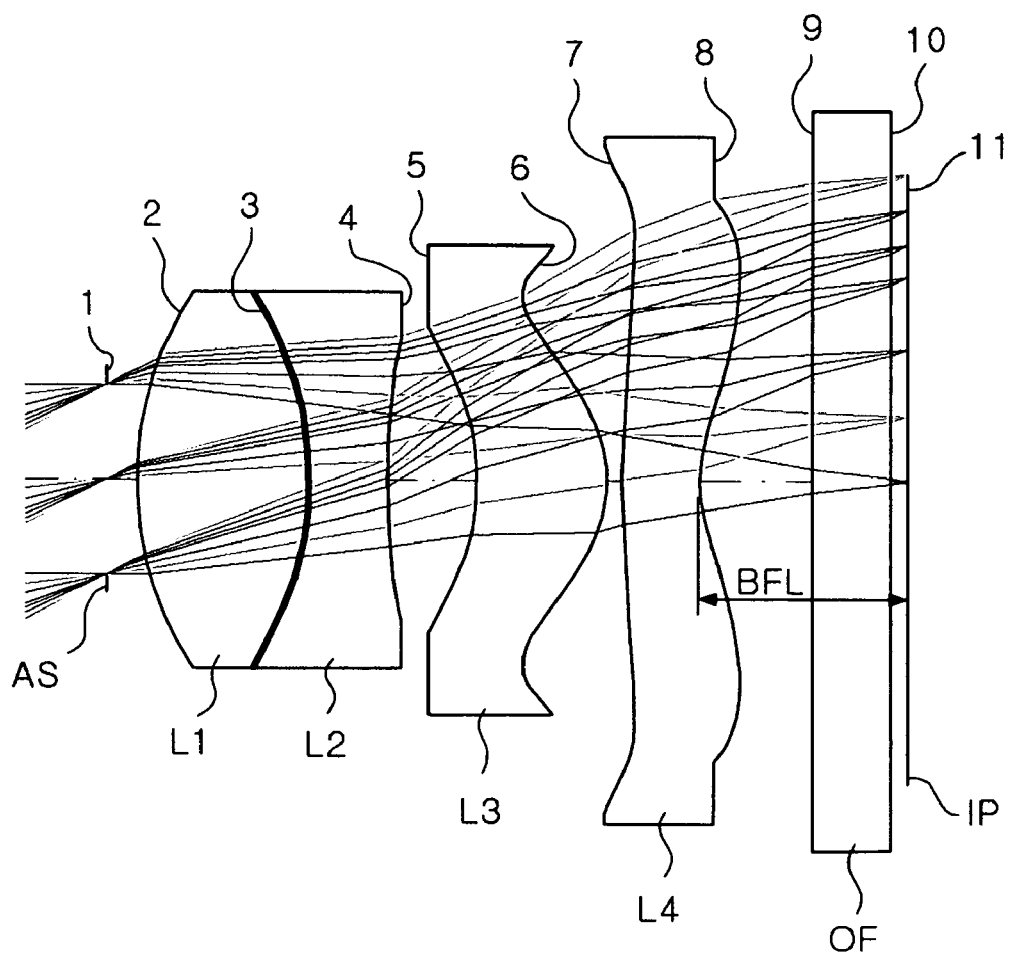
FIG. 11 is a view illustrating a lens construction of an optical system used for comparing a conventional art with the present invention.

Also, FIG. 7 is a view illustrating images of reference PSFs for respective object distances of a general optical system having a fixed focal length according to a conventional art, FIG. 8 is a view illustrating images of reference PSFs for respective object distances of a conventional optical system to which a mask is applied, FIG. 9 is a view illustrating images of reference PSFs for respective object distances according to the present invention, FIG. 10 is a view explaining image recovery of a conventional art and the prevent invention, and FIG. 11 is a view illustrating a lens construction of an optical system used for comparing a conventional art with the present invention.

An optical system for processing an image using PSF according to the present invention controls a BFL such that ΔPSF has a value less than 100%, and processes an image using PSF.

Referring to FIG. 2, the optical system 100 for processing an image using PSF includes one or more lenses 110 for forming an image of an object 50; an image sensor 120 for sensing an image formed by the lens; and an image processor 130 for recovering the image sensed by the image sensor using PSF (point spread function).

The lens 110 may consist of a plurality of lenses in order to realize an optical performance of an optical system. As long as the lens 110 is a lens of a fixed focal length, there is no limitation in a shape, power arrangement, and a number of lenses.

Also, the image sensor 120 may be a known sensor such as a charge coupled device (CCD) and a complementary metal oxide semiconductor (CMOS).

The optical system 100 controls a BFL (back focal length) defined as a distance between a refractive surface of a lens that is closest to an image-side and the image sensor, is controlled such that ΔPSF has a value less than a predetermined value.

Though descriptions are made for the BFL in the present specification, the present invention can be applied for a flange back, which is a distance between an end of a barrel in which a lens is mounted and an image sensor when an optical system is actually applied.

Referring to P1 in FIG. 3, an optical system of a fixed focal length can obtain an excellent image in a range of more than 1000 mm, which is an object distance that allows focusing because a size of PSF is small. However, as an object approaches closely to a camera, a size of PSF drastically increases and focusing is not properly performed, which reduces image quality.

At this point, when an object distance that allows focusing of a corresponding object is moved by controlling only BFL or flange back without addition or modification of optical parts, PSF distribution for an object distance changes.

Referring to P2 of FIG. 3, a size of PSF increases in an object distance range of more than 1000 mm, while a size of PSF decreases in an object distance range corresponding to a close-up shot and a difference between sizes of PSFs in the close-up shot reduces. In this manner, it is possible to make desired PSF distribution for a predetermined object distance by controlling the BFL or the flange back.

In this case, sizes of PSFs at object distances of a predetermined close-up shot (e.g., 10 cm) and infinity (e.g., more 10 m or more) can be compared using ΔPSF defined as Equation below.

$$\Delta PSF(\%) = \frac{PSF_\infty - PSF_{macro}}{(PSF_\infty + PSF_{macro})/2} \times 100$$

where, $PSF_\infty$: size of PSF at infinity, $PSF_{macro}$: size of PSF at a predetermined close-up shot distance set when an optical system is designed.

That is, it is possible to control the PSF distribution depending on an object distance and to make ΔPSF, which is a difference between PSF at a predetermined close-up shot distance and PSF at infinity small, by controlling a BFL or a flange back through simulation of an optical system.

Referring to P1 in FIG. 3, a conventional optical system of a fixed focal length has a ΔPSF value of 150%, which implies that a difference between corresponding PSFs is very large.

However, referring to P2 in FIG. 3, ΔPSF is about less than 50%. Referring to P3 in FIG. 3, an object distance allowing focusing is about 20 cm, and ΔPSF is about 17%.

That is, when the BFL or the flange back is controlled such that a difference in sizes of PSFs at a predetermined close-up shot distance and infinity reduces, PSF does not increase over an entire object distance, which minimizes image quality reduction for all object distances.

At this point, the BFL can be controlled such that ΔPSF has a value of less than 100% and a difference between a size of PSF at a predetermined close-up shot distance and a size of PSF at infinity reduces, but ΔPSF can be controlled to have a value of less than 50% such that the difference in sizes of PSFs reduces even more.

Furthermore, the difference in sizes of PSFs between a predetermined close-up distance and infinity can be controlled to be zero.

Since such PSF distribution may change depending on each optical system determined by lenses, ΔPSF may be selected such that each optical system has most appropriate PSF distribution over an entire object distance (for example, such that a size of PSF does not drastically increase over an entire object distance).

Also, the predetermined close-up object distance may be less than 20 cm for efficient close-up shot performance, and may be less than 10 cm such that close-up shot of a very close object can be performed.

Meanwhile, a general optical system of a fixed focal length has an object distance of 1 m that allows focusing. An optical system according to the present invention has an object distance of less than 1 m that allows focusing through controlling a BFL.

An optical system according to the present invention can provide an optical system having an advantage in recovering an image and reflecting a characteristic of each optical system by controlling only a BFL without addition or modification of an optical part in a general optical system of a fixed focal length.

Referring to P1 in FIGS. 3 and 4, a general optical system of a fixed focal length has ΔPSF of about 150%, and a size of PSF drastically decreases as an object distance becomes small.

Figure 5A:
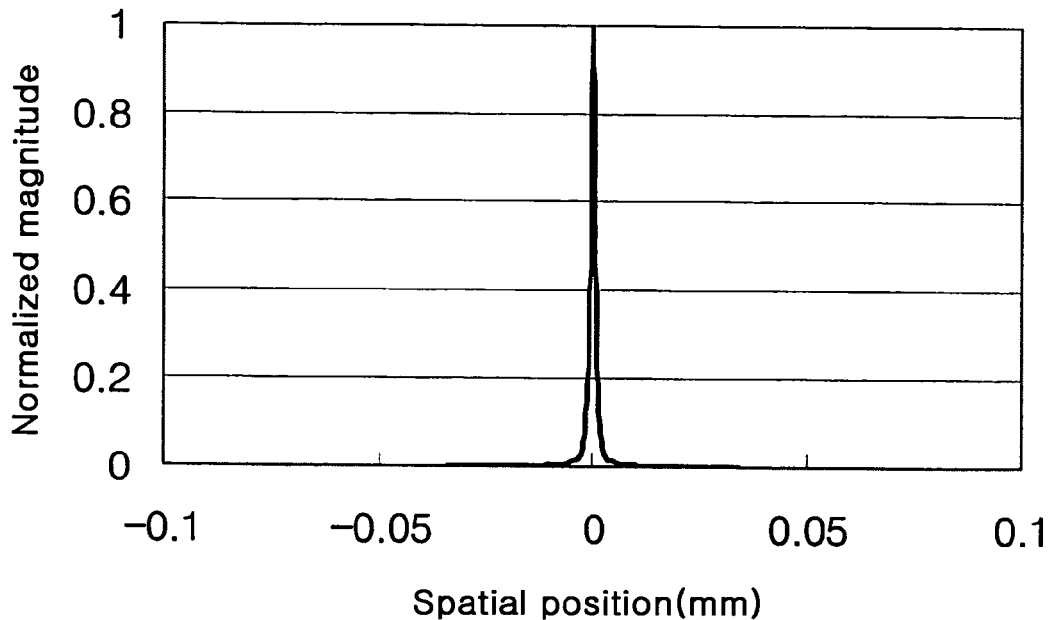
FIG. 5a to 5d are graphs illustrating LSFs of a conventional art and the prevent invention.
Figure 5B:
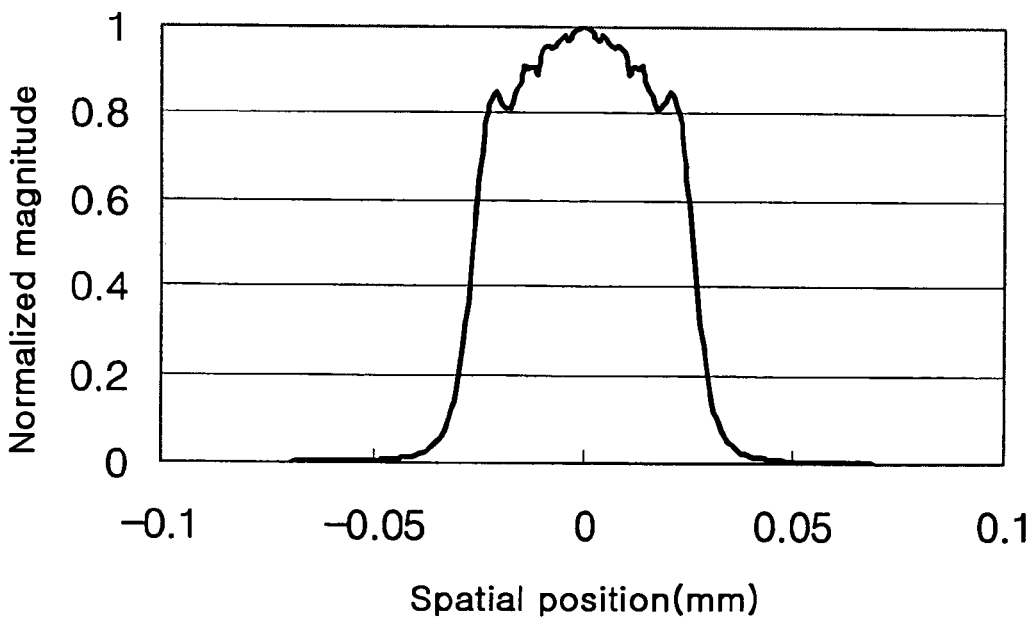

Accordingly, referring to FIG. 5b, a spatial position of a line spread function (LSF), which a one-dimensional function of PSF, increases.

That is, a spatial position increases as illustrated in FIG. 5b illustrating an optical system of a fixed focal length performs a close-up shot at an object distance of 10 cm compared to a case of FIG. 5a illustrating LSF when a focusing operation is properly performed in an optical system of a fixed focal length.

Figure 6A:
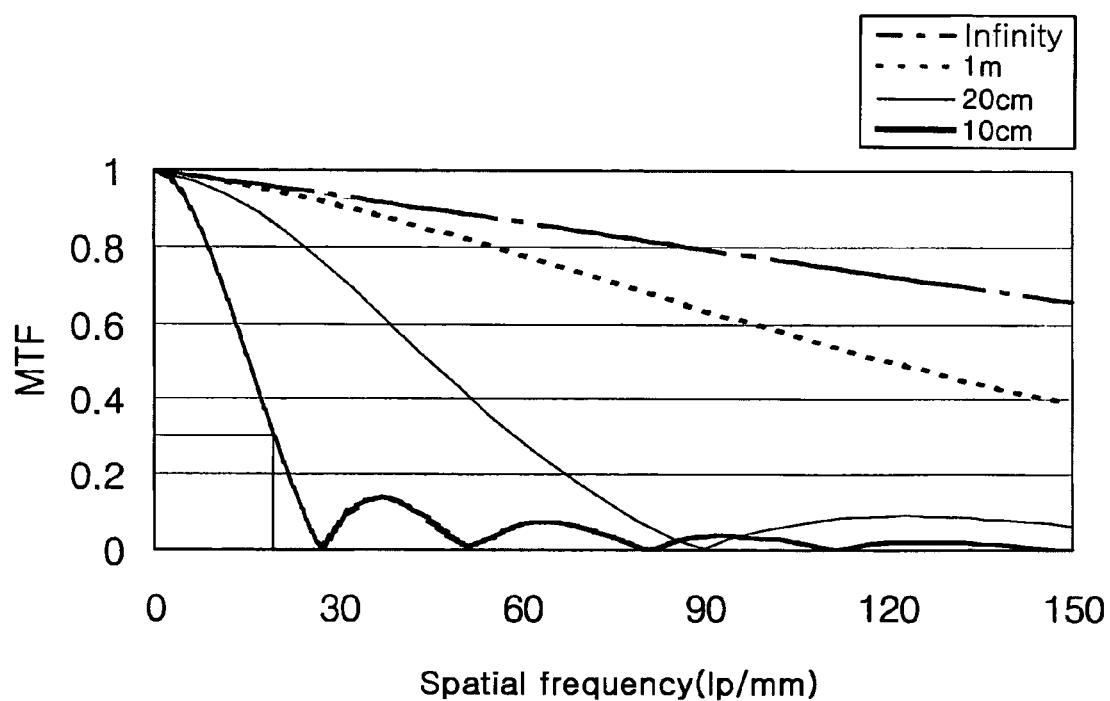
FIG. 6a to 6c are graphs illustrating an MTF of a conventional art and the prevent invention.

Also, referring to FIG. 6a, an optical system has a spacial frequency of 20 lp/mm for a modulation transfer function (MTF) of 30%.

Also, referring to FIG. 7, when an object distance that allows focusing is 1 m (FIG. 7b), PSF is lowest, and a size of PSF is maintained low for an object distance of infinity (FIG. 7a). However, as an object distance gradually reduces to 40 cm (FIG. 7c), 30 cm (FIG. 7d), 20 cm (FIG. 7e), 14 cm (FIG. 7f), 12 cm (FIG. 7g), and 10 cm (FIG. 7h), a size of PSF gradually increases.

As described above, since a size of PSF drastically increases as an object distance reduces in an optical system of a fixed focal length, an image quality reduces very much.

Also, referring to FIGS. 3 and 4, a conventional optical system, where a mask (a mask CPM 127-R20 by CDM Optics co. is used) is applied to a general optical system of a fixed focal length, can have PSF of similar sizes over various object distances (P4 in FIG. 4) but sizes of PSF are relatively large and asymmetric.

Figure 5C:
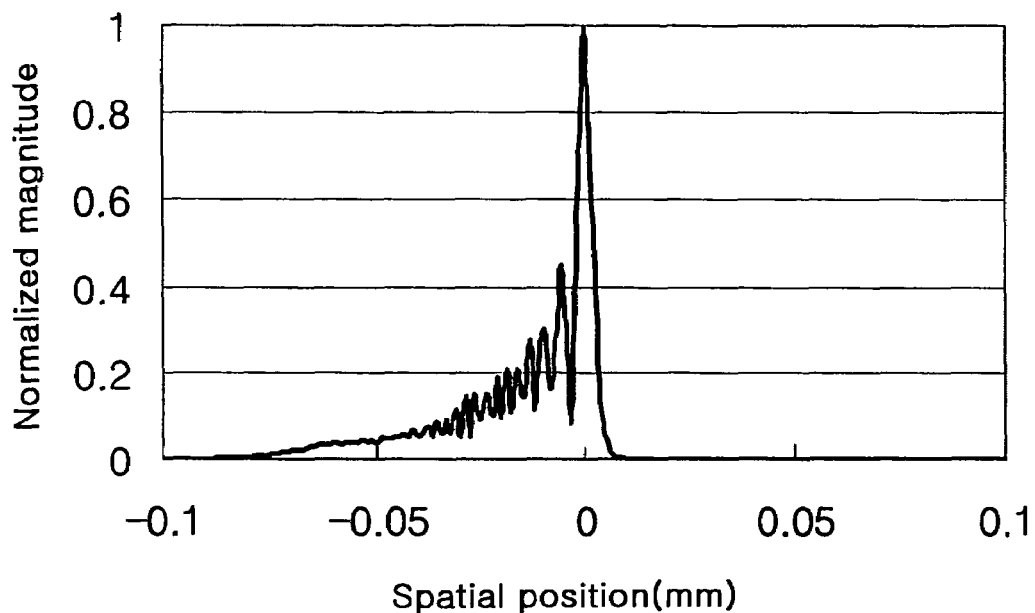

Accordingly, referring to FIG. 5c, a spatial position of a line spread function (LSF), which a one-dimensional function of PSF, increases on the whole.

That is, a spatial position increases when a conventional optical system that uses a mask performs a close-up shot at an object distance of 10 cm compared to a case of FIG. 5a illustrating LSF when a focusing operation is properly performed in an optical system of a fixed focal length.

Figure 6B:
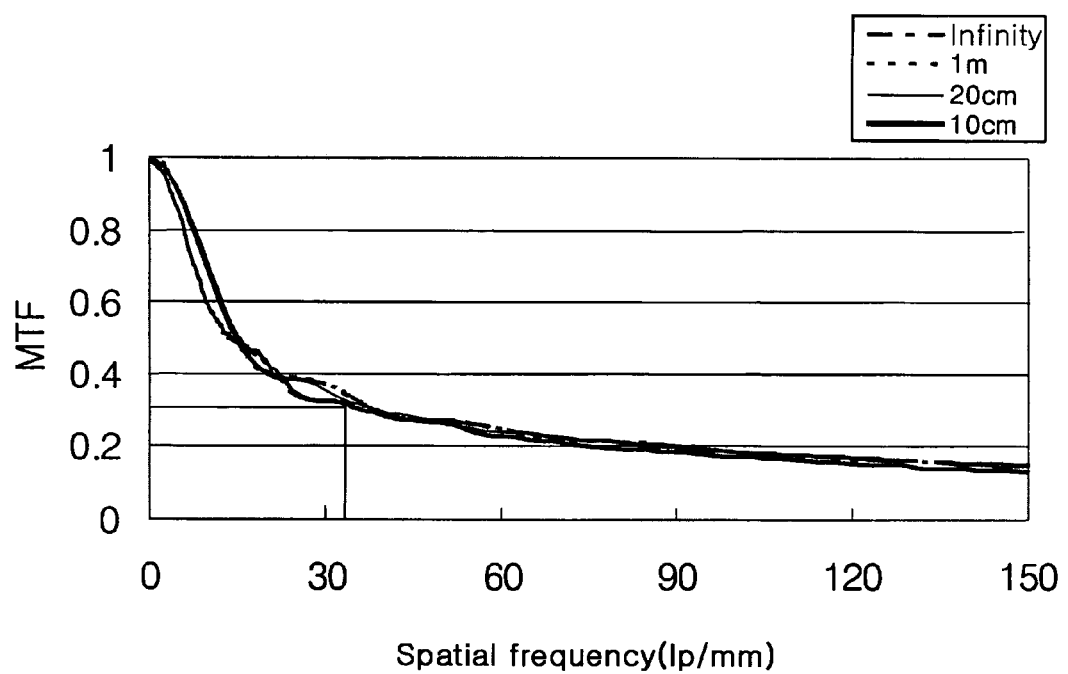

Also, referring to FIG. 6b, an optical system has a spacial frequency of 35 lp/mm for a MTF of 30%, and has a spacial frequency of 20 lp/mm for a MTF of 40%, which reduces optical characteristics.

Also, referring to FIG. 8, a size of PSF increases for all object distances of infinity (FIG. 8a), 40 cm (FIG. 8c), 30 cm (FIG. 8d), 20 cm (FIG. 8e), 14 cm (FIG. 8f), 12 cm (FIG. 8g), and 10 cm (FIG. 8h) as well as an object distance that allows focusing is 1 m (FIG. 8b).

As described above, even in an optical system that uses a mask, a size of PSF increases for an entire object distance, which deteriorates an image and reduces image quality of a recovered image.

When ΔPSF is 17% according to an embodiment of the present invention, an optical system has a PSF distribution as illustrated at P1 in FIGS. 3 and 4.

That is, an optical system according to an embodiment of the present invention controls a BFL or a flange back such that PSF has a small size in a range from a predetermined close-up shot distance to an object distance of infinity. At this point, an object distance that allows optimum focusing operation is about two times the predetermined close-up shot distance, but this optimum object distance changes depending on a construction of an optical system. The BFL or the flange back is determined using PSF simulation results of an optical system.

PSF of an optical system according to the present invention has a small size and is nearly symmetric compared to a convention optical system, and has a smaller PSF than that of a general optical system of a fixed focal length at a close-up shot distance (P3 in FIGS. 3 and 4).

Figure 5D:
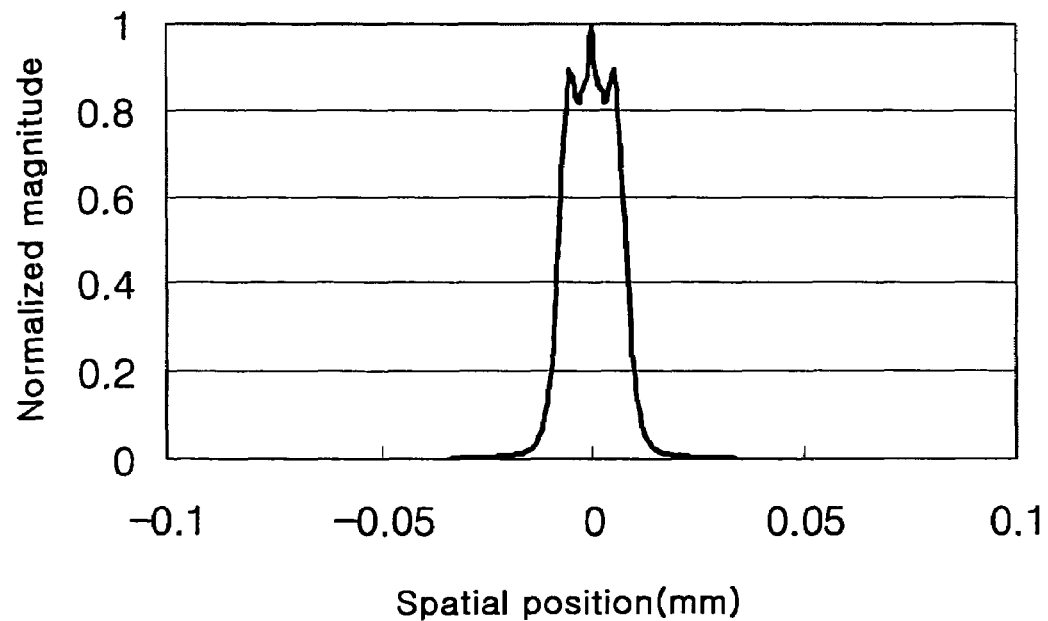

Accordingly, referring to FIG. 5d, when a close-up shot is performed at an object distance of 10 cm, a spatial position of an LSF, which a one-dimensional function of PSF, decreases compared to the cases of FIGS. 5b and 5c.

Figure 6C:
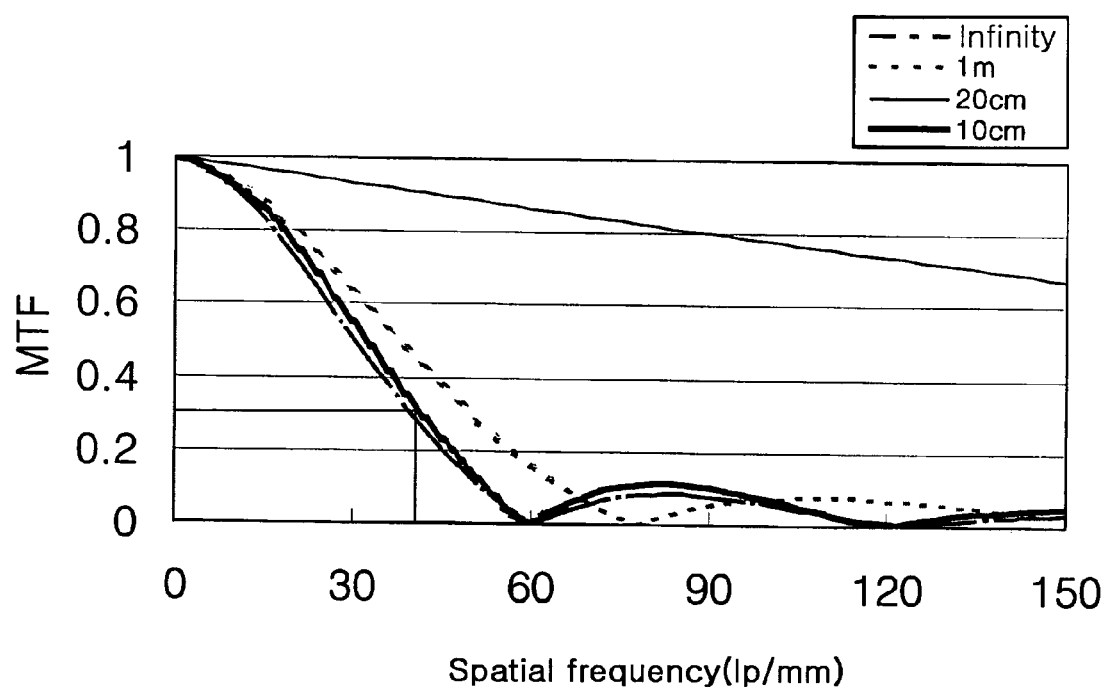

Also, referring to FIG. 6c, an optical system has a spacial frequency of 40 lp/mm for a MTF of 30%, and has a spacial frequency of 35 lp/mm for a MTF of 40%, which shows excellent optical characteristics compared to optical characteristics of the conventional optical system shown in FIGS. 6a and 6b.

Also, referring to FIG. 9, a size of PSF is relatively constant for all object distances of infinity (FIG. 9a), 1 m (FIG. 9b), 40 cm (FIG. 9c), 30 cm (FIG. 9d), 14 cm (FIG. 9f), 12 cm (FIG. 9g), and 10 cm (FIG. 9h) as well as an object distance that allows focusing is 20 cm (FIG. 9e).

As described above, since an optical system according to the present invention has a PSF of a small size and is symmetric, the optical system has advantage in recovering an image compared to the conventional optical system.

Meanwhile, the image processor 130 recovers an image using a PSF.

In detail, the image processor 130 tentatively recovers images using a PSF table generated for each object distance, selects a PSF having an image of best quality from the tentatively recovered images, and recovers all images using the selected PSF.

Since an optical system according to the present invention has a plurality of PSFs of different sizes depending on an object distance, a PSF most suitable for an image at each object distance exists. These PSFs are classified using a size or areal ratio to constitute a table. A PSF giving a best image is selected from the plurality of PSFs when processing an image. For this purpose, an object distance is divided into two or more steps to constitute a PSF table. For example, referring to FIG. 9, an object distance is divided to determine eight reference PSFs, but the number of divisions is not limited thereto.

At this point, a PSF giving a best image is selected from the reference PSFs when recovering an quality-reduced image. In this case, the recovered image has a virtual focus for each object distance.

FIG. 10 is a view illustrating images (FIGS. 10b and 10c) obtained by a general optical system of a fixed focal length and images (FIGS. 10d and 10e) obtained by an optical system according to the prevent invention, located at a close-up shot distance of 10 cm, respectively.

At this point, an object is a center image of a resolution target of International Organization for Standardization (ISO) 12233.

FIG. 10a illustrates a case where a focusing operation is properly performed at a close-up shot distance, so that the case does not need to be recovered.

However, comparison of an optical system of a fixed focal length shown in FIGS. 10b and 10c with an optical system according to the present invention shows that an image (FIG. 10e) recovered by the present invention has a higher quality than that of the optical system of the fixed focal length.

This is because the present invention has a high quality image before recovery and a PSF referred when the image is recovered is small compared to a conventional optical system of a fixed focal length or an optical system that uses a mask.

Meanwhile, an optical system shown in FIG. 11 is used for comparison of the conventional art with an optical system of the present invention.

A conventional optical system of a fixed focal length, a conventional optical system that uses a mask, and an optical system according to the present invention includes, sequentially from an object-side: an aperture stop AS, a first lens L1, a second lens L2, a third lens L3, a fourth lens L4, an infrared filter OF (optical filter), and an image plane IP. At this point, an effective focal length f of an entire system is 3.5119 mm, and an F number (FNo.) is 2.8, an entire angle of view 2ω of a lens is 60°, and a pixel pitch of the image plane IP is 3.3 μm.

However, the conventional optical system that uses the mask uses a mask CPM 127-R20 by CDM Optics co. located between the aperture stop AS and a surface 2 on an object-side 2 of the first lens L1.

Also, the present invention changes a BFL in order to change PSF distribution, and thus a total length TL between the aperture stop AS and an image plane IP also changes.

Exemplary numerical values obtained for an optical system shown in FIG. 11 are given by Table 1.

TABLE 1

| Plane No. | Radius of curvature | Thickness or interval between surfaces (mm) | Refractive index | Abbe number | Remark |
|---|---|---|---|---|---|
| 1 | ∞ | 0.2000 | — | — | Aperture stop |
| 2 | 2.3482 | 1.1000 | 1.8042 | 46.5 | 1st lens |
| 3 | −2.3629 | 0.5000 | 1.8052 | 25.4 | 2nd lens |
| 4 | 5.3543 | 0.5706 | — | — | |
| *5 | −1.8321 | 0.8412 | 1.5312 | 56.0 | 3rd lens |
| *6 | −0.8481 | 0.1000 | — | — | |
| *7 | 3.8342 | 0.5000 | 1.5312 | 56.0 | 4th lens |
| *8 | 0.9548 | 0.7888 | — | — | |
| 9 | ∞ | 0.5000 | 1.5168 | 64.1 | Infrared filter |
| 10 | ∞ | #1 | — | — | |
| 11 | ∞ | — | — | — | Image plane |

In Table 1, #1 is varied in the conventional optical system and the optical system according to the present invention, and the varied value is given by Table 2.

Also, a BFL and a TL between the aperture stop AS and the image plane IP are changed as given by Table 2.

TABLE 2

| | #1 | BFL | TL |
|---|---|---|---|
| General optical system | 0.0341 | 1.3229 | 5.1347 |
| Present invention | 0.1 | 1.3888 | 5.2006 |

In Table 1, * represents an aspherical surface, and the aspherical surface is obtained by Equation below.

$$z = (Y^2/r)\left[1 + \sqrt{1 - (1+K)(Y/r)^2}\right] + AY^4 + BY^6 + CY^8 + DY^{10}$$

where,

Z: distance toward an optical axis from a vertex of a lens

Y: distance toward a direction perpendicular to an optical axis r: radius of curvature on a vertex of a lens K: conic constant A,B,C, D and E: aspherical coefficients Conic constant and aspherical coefficients A,B,C,D, and E are given by Table 3 below.

| | Surface No. | | | |
|---|---|---|---|---|
| | *5 | *6 | *7 | *8 |
| K | 0.86392 | −0.84924 | −159.64933 | −7.23343 |
| A | −0.05504 | 0.23746 | −0.03719 | −0.07748 |
| B | −0.01111 | −0.20721 | 0.03517 | 0.02599 |
| C | 0.15492 | 0.16838 | −0.01138 | −0.00514 |
| D | −0.05906 | −0.03495 | 0.00108 | 0.00016 |

A method for processing an image according to the present invention will be described below.

Figure 12:
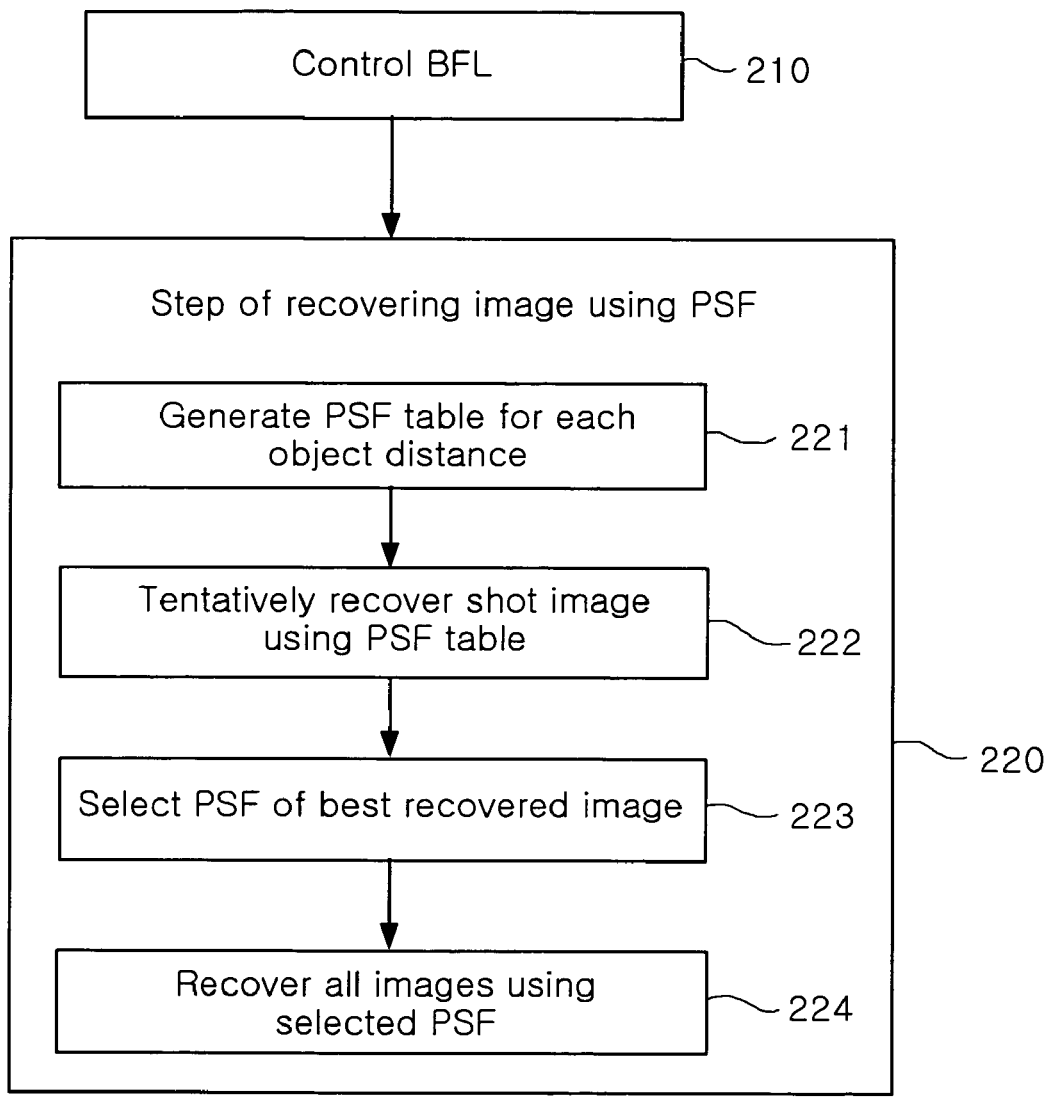
FIG. 12 is a flowchart illustrating a method of processing an image according to the present invention.

FIG. 12 is a flowchart illustrating a method of processing an image according to the present invention.

Referring to FIG. 12, the method of processing the image controls a BFL such that ΔPSF has a value of less than 100%, and processes an image using a PSF. The method of processing the image includes the following steps.

a. step 210 of controlling a BFL of an optically system of a fixed focal length;

In an optical system of a fixed focal length, a BFL is controlled such that ΔPSF has a value of less than 100%.

At this point, the BFL is defined as a distance between a refractive surface of a lens closest to an image-side and an image sensor, and ΔPSF is defined by Equation below.

$$\Delta PSF(\%) = \frac{PSF_\infty - PSF_{macro}}{(PSF_\infty + PSF_{macro})/2} \times 100$$

where, $PSF_\infty$: size of PSF at infinity, $PSF_{macro}$: size of PSF at a predetermined close-up shot distance.

As described above, when an object distance that allows focusing is moved by controlling only a BFL or a flange back without addition or modification of an optical part, PSF distribution according to an object distance changes.

Referring to P2 in FIG. 3, a PSF increases at an object distance of 1000 mm or more, while a PSF decreases at a close distance decreases and a difference in a PSF also reduces. In this manner, it is possible to provide a desired PSF distribution according to an object distance by controlling a BFL or a flange back.

In this case, a size of a PSF at a predetermined close-up shot distance (e.g., 10 cm) and at an object distance of infinity (e.g., 10 m or more) can be compared with each other using ΔPSF.

That is, it is possible to control PSF distribution that depends on an object distance by controlling a BFL or a flange back through simulation of an optical system. Also, it is possible to make a difference ΔPSF associated with the predetermined close-up shot distance and an object distance of the infinity small as illustrated in P3 of FIG. 3.

At this point, the BFL can be controlled such that ΔPSF has a value less than 100% to make a difference ΔPSF in a size of PSF at the predetermined close-up shot distance and the infinity small. Further, ΔPSF can be controlled to have a value less than 50% such that a difference ΔPSF is smaller.

Furthermore, ΔPSF can be controlled to zero.

Since the PSF distribution changes depending on an optical system determined by lenses, it is recommended to select ΔPSF such that each optical system has PSF distribution most suitable for an entire object distance range.

Also, the predetermined close-up shot can be set to 20 cm or less in order to perform an efficient close-up shot function, and can be set to 10 cm or less so that a close-up shot can be performed for a very close object.

b. step 220 of recovering an image using a PSF;

b1. step 221 of constructing a PSF table for each object distance;

Since an optical system according to the present invention has different PSFs depending on an object distance, a PSF most suitable for an image at each object distance exists. A plurality of PSFs are classified using a size or areal ratio to constitute a table. At this point, for comparison of the PSFs, an object distance is divided into two or more steps to constitute a PSF table. For example, referring to FIG. 9, an object distance is divided to eight steps to determine eight reference PSFs, but the number of divisions is not limited thereto.

Also, an object distance is divided into less than a predetermined number of steps in view of a capacity of an image processor in order to increase an image processing speed by reducing the number of reference PSFs, so that a PSF table is constructed.

b2. step 222 of tentatively recovering shot images using the PSF table

A tentative recovering process is performed in order to recover shot images. That is, some of the shot images is tentatively recovered using the PSF table.

b3. step 223 of comparing the tentatively recovered images and selecting a PSF of a best recovered image;

After that, a PSF giving a best recovered image is selected from the tentatively recovered images.

In this case, the recovered images have a virtual focus for each object distance.

b4. step 224 of recovering all images using the selected PSF table

Last, all images are recovered using the selected PSF table.

As described above, the present invention recovers an image with reference to a PSF suitable for the shot image, and the recovered image has a kind of virtual focus.

A method of processing an image according to the present invention has advantages that a size of a PSF is small and an image processing speed is fast. This is because, when the size of the PSF is small, an amount of information to be processed during an image processing operation reduces and thus a calculation speed is fast.

Particularly, the method of processing the image according to the present invention has a small PSF even for a small object distance, so that recovery of a quality-reduced image shot at a close distance is excellently performed.

Also, using the method of processing the image according to the present invention, it is possible to realize an optimized optical system having an advantage in recovering an image by changing a BFL or a flange back without addition or modification of an optical part in a general optical system of a fixed focal length.

As described above, according to the present invention, since a lens driving unit is not required in order to realize an auto-focusing operation for a close distance and a long distance, an optical system of a small size and light-weight can be provided.

Also, according to the present invention, it is possible to provide an optical system having an advantage in recovering an image by controlling only a BFL without addition or modification of an optical part in a conventional optical system of a fixed focal length. Also, an image is recovered using a PSF, so that an excellent image can be obtained over a wide object distance range from a close distance to a long distance.

Also, since a size of PSF is small, the present invention can obtain an excellent image and have a fast image processing speed compared to a conventional optical system of a fixed focus or a conventional optical system that uses a mask.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical system for processing an image using a point spread function (PSF), the optical system comprising:
    one or more lenses;
    an image sensor for sensing an image formed by the lenses; and
    an image processor for recovering the image sensed by the image sensor using the PSF,
    wherein a back focal length (BFL) defined as a distance between a refractive surface of one of the lenses that is closest to an image-side and the image sensor, is controlled such that ΔPSF defined by Equation below has a value less than 100%, $$\Delta PSF(\%) = \frac{PSF_\infty - PSF_{macro}}{(PSF_\infty + PSF_{macro})/2} \times 100, \quad \text{Equation}$$

where PSF∞: size of PSF at infinity, PSFmacro: size of PSF at a predetermined close-up shot distance.

2. The optical system of claim 1, wherein the image processor selects a PSF of a best image among PSFs of tentatively recovered images using a PSF table generated for each object distance, and recovers all images using the selected PSF.

3. The optical system of claim 1, wherein the BFL is controlled such that ΔPSF has a value less than 50%.

4. The optical system of claim 2, wherein the BFL is controlled such that ΔPSF has a value less than 50%.

5. The optical system of claim 1, wherein the predetermined close-up shot distance is less than 20 cm.

6. The optical system of claim 2, wherein the predetermined close-up shot distance is less than 20 cm.

7. The optical system of claim 1, wherein the predetermined close-up shot distance is less than 10 cm.

8. The optical system of claim 2, wherein the predetermined close-up shot distance is less than 10 cm.

9. The optical system of claim 1, wherein, when an object is focused, a corresponding object distance is less than 1 m.

10. The optical system of claim 2, wherein, when an object is focused, a corresponding object distance is less than 1 m.

11. An image processing method for an optical system comprising:
    controlling a back focal length (BFL) defined as a distance between a refractive surface of one of lenses that is closest to an image-side and an image sensor, such that Δpoint spread function (ΔPSF) defined by Equation below has a value less than 100% using a size of a PSF at infinity and a size of a PSF at a predetermined close-up shot distance; and
    recovering an image by image processor using a PSF, $$\Delta PSF(\%) = \frac{PSF_\infty - PSF_{macro}}{(PSF_\infty + PSF_{macro})/2} \times 100, \quad \text{Equation}$$

where PSF∞: size of PSF at infinity, PSFmacro: size of PSF at a predetermined close-up shot distance.

12. The method of claim 11, wherein the recovering of the image comprises:
    generating a PSF table for each object distance;
    tentatively recovering shot images using the PSF table;
    comparing tentatively recovered images with one another to select a PSF of a best recovered image; and
    recovering all images using the selected PSF.

13. The method of claim 11, wherein the controlling of the BFL comprises controlling the BFL such that ΔPSF has a value less than 50%.

14. The method of claim 12, wherein the controlling of the BFL comprises controlling the BFL such that ΔPSF has a value less than 50%.

15. The method of claim 11, wherein the predetermined close-up shot distance is less than 20 cm.

16. The method of claim 12, wherein the predetermined close-up shot distance is less than 20 cm.

17. The method of claim 11, wherein the predetermined close-up shot distance is less than 10 cm.

18. The method of claim 12, wherein the predetermined close-up shot distance is less than 10 cm.

19. The method of claim 12, wherein the generating of the PSF table comprises dividing the object distance into two or more operations to generate the PSF table.

* * * * *